United States Patent [19]

Mashiko et al.

[11] Patent Number: 5,186,185
[45] Date of Patent: Feb. 16, 1993

[54] FLAVORING GRANULE FOR TOBACCO PRODUCTS AND A PREPARATION METHOD THEREOF

[75] Inventors: Kimio Mashiko, Odawara; Sadatsuyo Isoda; Atsushi Tateno, both of Hiratsuka, all of Japan

[73] Assignee: Japan Tobacco Inc., Tokyo, Japan

[21] Appl. No.: 680,903

[22] Filed: Apr. 5, 1991

[30] Foreign Application Priority Data

Jul. 6, 1990 [JP] Japan .................................. 2-177370
Jul. 18, 1990 [JP] Japan .................................. 2-187923

[51] Int. Cl.$^5$ ............................................. A24B 15/10
[52] U.S. Cl. .................................. 131/337; 131/352; 131/359
[58] Field of Search ............... 131/335, 359, 369, 352, 131/337

[56] References Cited

U.S. PATENT DOCUMENTS 4,889,144 12/1989 Tateno et al. .

FOREIGN PATENT DOCUMENTS 0082459 6/1983 European Pat. Off. .
0292949 11/1988 European Pat. Off. .
64-27461 1/1989 Japan .
945142 12/1963 United Kingdom .
2182063 5/1987 United Kingdom .

OTHER PUBLICATIONS

"Collection of Lectures of 1989 Autumn Research Announcement Meeting" Nov. 14–15, 1989.

Primary Examiner—V. Millin
Assistant Examiner—J. Doyle
Attorney, Agent, or Firm—Birch, Stewart, Kolasch & Birch

[57] ABSTRACT

A flavoring granule for tobacco products comprising, a solid substrate granule of which comprises natural polysaccharides or derivatives thereof, and a flavor for tobacco products which is contained in said solid granule and is encapsulated in said solid granule so as to be released upon breakage of said solid granule, wherein said solid granule further contains casein as a diluent. Also disclosed is a preparation method thereof, by which the flavoring granule of large size and excellent sphere shape can be obtained.

10 Claims, 1 Drawing Sheet

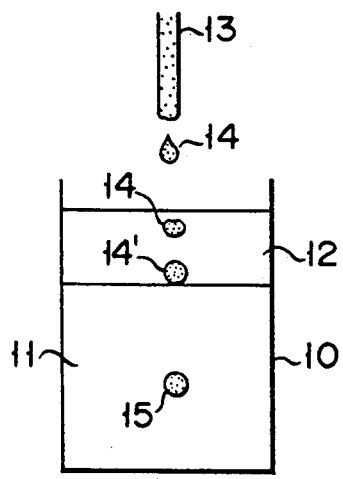
F I G. 3
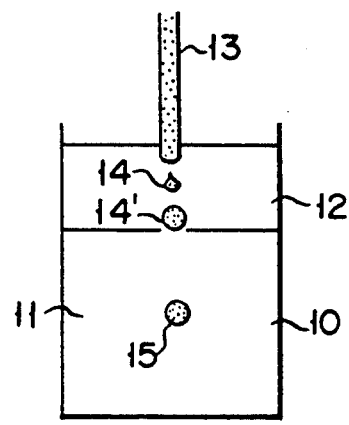
F I G. 4
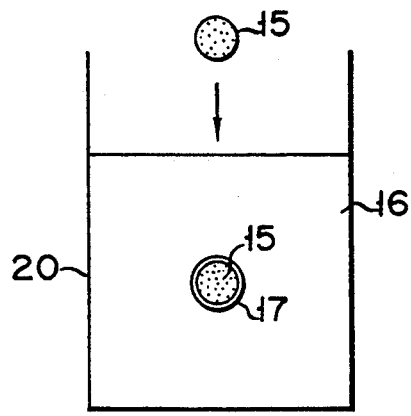
F I G. 5

FLAVORING GRANULE FOR TOBACCO PRODUCTS AND A PREPARATION METHOD THEREOF

BACKGROUND OF THE INVENTION

1. Field of the Invention

The present invention relates to a flavoring granule for tobacco products, which encapsulates flavors to be added to tobacco products and is so designed to release said flavors encapsulated therein at a designed time.

The present invention also relates to a method for preparing said flavoring granules for tobacco products, each of which has a comparatively large diameter in a satisfactorily spherical shape in particular.

2. Description of the Related Art

Tobacco products, in general, are added by flavors for purposes of improving fragrant smoking taste. Most flavors to be added to said products are classified into two group: the primary flavor as a casing sauce and the secondary flavor as a top flavor. Both kinds of flavors are generally added directly to the shredded tobacco by means of spraying during the preparation process of tobacco products.

Among these flavors, especially many of the secondary flavors, however, are volatile so that they are readily volatilized to diffuse into an atmosphere and easily deteriorated due to a preparation heat or an air flow during the manufacturing process, which results in reduced efficiency of flavor-addition. Further, volatilization and deterioration of flavors can also occur during the product storage. On the other hand, when flavors are added in excess amounts from the view point of the flavor yield, it may cause troubles such as staines in the cigarette paper, etc.

Therefore, it has been proposed to utilize such secondary flavors in a form of flavoring granule wherein said flavors are encapsulated within a solid comprising natural polysaccharides or derivatives thereof, in order to protect the flavor from heat and air and to prevent volatilization and deterioration of the flavor (Unexamined Published Japanese Patent Application No. '89-27461). Such flavoring granule was contained in a filter tip of a cigarette and was crushed or broken by being pressed with fingers of a smoker at the time of smoking, rendering the flavor sealed therein to volatilize and diffuse.

To prepare such flavoring granules, there has been disclosed as below (Unexamined Published Japanese Patent Application No. '89-27461).

First, flavor substances to be encapsulated in granules are mixed with an aqueous solution of natural polysaccharides or derivatives thereof, such as sodium alginate and carageenan, etc. The resultant flavor mixture is allowed to drop, as illustrated in FIG. 1, from the tip of a nozzle 1 as a drop 2 into a hardening solution 3. The natural polysaccharides contained in the drop 2 are gelated by the hardening solution 3 to form a granule 4 which is encapsulating said flavor. As the hardening solution, aqueous solutions of metal salts such as salts of calcium, potassium, magnesium, and aluminum, etc. can be used.

In the above method, the diameter of the granule 4 has been controlled by adjusting the concentration (i.e. viscosity) of said aqueous solution of polysaccharides or an outer diameter of the nozzle 1. When a concentration of the solution is constant, the diameter of the granule 4 is directly proportional to the outer diameter of the nozzle 1 in a certain range. When the outer diameter of said nozzle 1 is constant, the higher the concentration is the larger becomes the diameter of said granule 4. However, the control effect of the granule diameter obtained by the concentration adjustment is not so prominent as compared with that obtained by the nozzle adjustment.

The above mentioned flavoring granules according to said prior art have been confronting with such drawbacks as: too hard to be crushed because of their small size in diameter and their high density. In addition, they seldom break into fine pieces when crushed, so that the flavoring effect can not be attained sufficiently. Furthermore, since a change of touch upon crushing can not be felt clearly, it is difficult to confirm whether the granule in the filter tip is broken or not.

Hereinbelow, problems concerning the granule diameter will be explained in detail.

The largest diameter of the granule 4 in accordance with said prior art is, at the most, 7 mm in a condition before drying and about 4.5 mm after drying. Even when the outer diameter of the nozzle 1 is extremely enlarged, a drop having a larger diameter than above can not produced. If the concentration of the raw liquid for granules is increased so as to elevate the surface tension of the drop 2, the granule 4 will have, though a little larger diameter, not a spherical shape but an indefinite shape such as oval, rod and the like. The reason why the spherical shape can not be obtained is that the drop has too high viscosity to become spherical spontaneously in the air, and it falls into the hardening solution 3 with the indefinite shape and hardens therein as it is.

Further, as illustrated in FIG. 2, even when the raw solution is extruded from the tip of the nozzles immersed into the hardening solution 3, the drop 2 will harden in a rod shape before it gets spherical.

SUMMARY OF THE INVENTION

The primary object of the present invention is to provide a flavoring granule for tobacco products, which can be crushed easily at the time of smoking and of which breakage can be confirmed clearly through a touch feeling.

Another object of the invention is to provide a method for preparing the flavoring granules for tobacco products, each of which has not only a satisfactory spherical shape but also a relatively large diameter, which have been hardly attained by the prior art.

To attain said primary object, the present invention employs casein which serves as a diluent of the flavoring granules for tobacco products, by mixing the casein in the granules.

In other words, the primary object of the present invention can be achieved by the flavoring granules for tobacco products, each of which comprising: a solid des derivatives thereof; and flavors for tobacco products which are contained in the solid substrate granule and encapsulated therein so as to be released upon crushing of the solid granule, wherein the solid substrate granule further contains casein as a diluent.

To attain the second object of the present invention, there is provided an liquidous oil layer above the hardening solution for purposes of adjusting the shape of a drop of the granule raw solution into spherical, before being fallen or introduced to the hardening solution.

In other words, the second object can be achieved by a method of preparing flavoring granules for tobacco products comprising a step of hardening a drop of a hardenable liquidous raw material containing natural polysaccharides or derivatives thereof, and flavors together with casein serving as a diluent, by feeding the drop into a certain hardening solution layer capable of hardening said liquidous raw material, wherein a liquidous oil layer having a smaller specific gravity together with a smaller surface tension than the hardening solution and not mingling with said hardening solution is so arranged as to be brought into contact with the surface of said hardening solution layer to form an interface therebetween; and the drop of the liquidous raw material is introduced into the liquidous oil layer and is allowed to stay for certain period of time to get spherical and thereafter said drop is allowed to fall into said hardening solution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIGS. 3 and 4 are explanatory views of the method according to the present invention for preparing the flavoring granules for tobacco products respectively; and FIG. 5 illustrates further treatment of coating on the flavoring granules for tobacco products prepared by the method of the present invention.

DETAILED DESCRIPTION OF THE PREFERRED EMBODIMENTS

Figure 1:
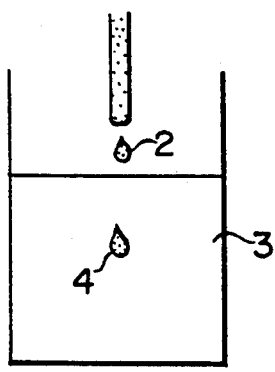
FIGS. 1 and 2 are explanatory views of a conventional methods for preparing the flavoring granules for tobacco products respectively.

The flavoring granules for tobacco products in accordance with the present invention will be explained below.

Natural polysaccharides or derivatives thereof, to be used as a substrate for the flavoring granules of the present invention, are selected from the group consisting of pectins, gum arabic, gelatin, carageenan, sodium alginate, starch and derivatives thereof, cellulose derivatives, and a mixture of two or more of the aforementioned materials. Especially a mixture of a salt of alginic acid and a salt of carboxymethylcellulose is preferable.

Flavors to be used in the present invention may not be limited particularly and almost every kind of flavor is applicable, among which powdery flavors and oily flavors are employed advantageously. Typical powdery flavors include licorice, kudzu, hydrangea, Japanese white bark magnolic leaf, chamomile, fenugreek, clove, menthol, Japanese mint, sage, aniseed, cinnamon and herb, etc., all powdered in a size of about 1 μm to 5 mm. Typical oily flavors include lavender, cinnamon, cardamon, apium graveolents, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ilangilang, sage, spearmint, fennel, piment, ginger, anise, coriander, and coffee, etc.

The casein amount to be added as a diluent in the present invention is preferably within a range of from 5 to 50% by weight based on the dry weight of the product granule. An addition amount of casein exceeding 5% by weight will cause undesirable increase in viscosity and in thixotropy of the raw liquid for granules. As a result, when the liquidous drop is permitted to pass through the oil layer, granules each having a satisfactorily sphere shape can not be obtained. On the other hand, an addition amount less than 5% by weight may result in a heavier, dense granule, which means that the breakage strength of the productant granule becomes too high to be crushed easily and that a change of a touch feeding upon crushing becomes lowered.

Meanwhile, the flavoring granules according to the present invention may further be coated with a film comprising natural polysaccharides or derivatives thereof.

Since the flavoring granules according to the present invention, as explained above, contain casein as a diluent, strengths thereof are lowered so that they can be easily broken by applying an appropriate force. Further, a change of touch upon crushing can be felt clearly, which results in an easy confirmation of the breakage.

Hereinbelow, the method of the present invention for preparing the above mentioned flavoring granules for tobacco products will be described.

Natural polysaccharides or derivatives thereof, and flavors together with casein are added into water and are dissolved by stirring to give a raw liquid for granules in a paste form. The order of addition of the respective components may be optional, but it is recommended that after dissolving the natural polysaccharides or derivatives thereof in water, flavors and casein are added and dissolved therein.

Separately, a glass beaker 10 is taken as shown in FIG. 3, for example, and a hardening solution 11 is fed therein. Above the hardening solution layer 11, a liquidous oil 12 is poured gently and the resultant mass is left still to separate two layers as illustrated in the figure. Then, the raw liquid for granules previously prepared is fed into the liquidous oil layer 12 as a drop 14 in such a manner that, as shown in FIG. 3, the raw liquid is allowed to fall spontaneously from the tip of a nozzle 13 into the liquidous oil layer. It may be possible that the raw liquid is supplied mechanically or successively by means of a quantitative pump or pipette and the like. In the case of using the pump or the pipette, the tip of a nozzle 13 may be immersed into the liquidous oil layer 12 to directly pour a certain quantity of the raw liquid into the oil layer, as shown in FIG. 4.

A composition of the hardening solution 11 in the present invention may be selected appropriately, depending on the composition of the raw liquid for granules to be used. For example, when the raw liquid is an aqueous solution of the natural polysaccharides or derivatives thereof, such as sodium alginate and carageenan, etc., aqueous solutions of metal salts, such as salts of calcium, potassium, magnesium and aluminum, etc., may be used as the hardening solution. The concentration of the hardening solution is, in case of calcium chloride. preferably within a range of from 0.2 to 20% by weight. The depth of said hardening solution layer 11 is not limited particularly so long as it is as much as or greater than the diameter of the granules to be produced.

Regarding the liquidous oil layer 12 in the present invention, any kind of oil may be applicable so long as it has a smaller specific gravity and a smaller surface tension than the hardening solution. Such oils are exemplified as: edible oils such as soybean oil, cottonseed oil, corn oil, sesame oil, rapeseed oil, peanut oil, camellia oil, olive oil, etc.; and mineral oils and a mixture of these oils. However, considering that the present invention can be useful also in a medical field or foodstuffs field, the edible oils are recommended.

In the present invention, for the purpose of adjusting the interfacial tension between the two layers, a surfactant may be added to at least one layer of the liquidous oil layer 12 and the hardening solution layer 11. A HLB value of such surfactant is not particularly limited, but may be fall within a range from 1 to about 20. Furthermore, various kinds of surfactants, for example, cationic, anionic, nonionic and ampholytic surfactant may be used. The concentration of the surfactant to be used is preferably not more than 5% by weight relative to the oil.

In the present invention, the liquidous oil is not restricted in its depth particularly so long as it is as deep as or deeper than the diameter of the granules to be formed.

In accordance with the method of the present invention, the granule having a diameter of 8 mm or more in almost complete spherical shape, which can hardly be produced by the prior art, can be prepared in such way that: the drop 14 of the raw liquid for granules is allowed to stay in the liquidous oil layer 12 enough to obtain a complete spherical shape, and then, the resultant drop is hardened in the hardening solution 11. The more specific action will be explained as follows.

The greater is the surface tension of a liquidous drop 14 than that of the surrounding liquid, the more susceptible for said drop 14 to become spherical. According to the present invention, the surface tension of the liquidous oil layer 12 is far smaller than that of the hardening solution 11 so that the liquidous drop 14 in said oil layer 12 will readily get spherical as compared in the hardening solution 11. Therefore, by allowing liquidous drop 14 to stay in the liquidous oil layer for certain period of time, even such a large drop as practically incapable of being spherical when directly introduced into the hardening solution 11, can be formed in almost complete spherical shape 14'. In other words, it is of prime importance to let the liquidous drop 14 stayed in the liquidous oil layer 12 for certain period of time so as to get spherical. The retention of the liquidous drop 14' in the oil layer 12 for certain time may also be attained by a supporting action due to the interfacial tension between the oil layer 12 and the hardening solution 11 layer. The liquidous drop 14' after formed in a spherical shape, falls into the hardening solution layer 11 and hardens therein.

The larger is the drop 14 or the higher is the concentration or viscosity of the drop 14, the longer must be the retention time in the oil layer 12 or spherically-shaping layer. On the contrary, a tiny drop 14 or a low concentration drop can become enough spherical even in a short retention time. Therefore, in the present invention, it is recommended that the retention time of the liquidous drop 14 in the liquidous oil layer 12 is controlled, depending on the diameter of the granule to be obtained.

The retention time in the liquidous oil layer 12 becomes prolonged with an increase in oil viscosity. On the other hand, an addition of a surfactant to the liquidous oil layer 12 will result in a lowering of the interfacial tension between the oil layer 12 and the hardening solution layer 11 so that the retention time can be shortened depending on the concentration of the surfactant. Thus the retention time of the liquidous drop 14 can be controlled by adjusting the viscosity of the oil layer 12 and the quantity of the surfactant to be added.

In the method of the present invention, it is desirable to add a surfactant to a hardening solution 1. If added to the hardening solution 11, the surfactant serves to improve the difficulty of oil removal from the surface of the liquidom drop 14. The surfactant also serves to improve the shape of the hardened grains formed in the hardening solution 11.

As explained above, the feature of the flavoring granule for tobacco products in accordance with the present invention is an addition of casein as a diluent, which results in an appropriately lowered strength of the granule. Consequently, such prominent effects can be attained that the granule is readily crushable and its breakage can be confirmed clearly through a touch feeling, etc.

Also in accordance with the preparation method of the present invention, even such a large granule as has not been formed into a spherical shape by the prior art, can be produced in an almost complete spherical shape. In addition, the raw liquid having a relatively higher concentration can be employed in the present invention as compared with the prior art in which a lower concentration of the raw liquid has been required to maintain the spherical shape of the liquidous drop. In the present invention, it is rather easy to have the granule formed in a spherical shape so that it becomes possible to prepare spherical granule from the raw liquid of a higher concentration.

Hereinbelow, the present invention will be described in detail by way of Examples.

EXAMPLE 1

Process 1

50 ml of distilled water were taken in a beaker of 200 ml. Then, 0.6 g of sodium alginate was added into the beaker little by little with stirring by means of a stirrer to dissolve, thereby preparing a solution (referred to as liquid A, hereafter).

Separately, 5 ml of olive oil were taken in a beaker of 100 ml, added by 5 g of powdery L-menthol, and then subjected to heating at 40° C. to dissolve menthol contained therein. The resultant menthol solution was added by 20 g of corn starch and mixed well by means of a spurtle (referred to as liquid B, hereafter).

Liquid A was added by liquid B little by little with stirring to be dispersed and thereafter 10 g of casein were added thereto, and dispersed to yield a raw liquid for granules.

Process 2

300 ml of 0.5% calcium chloride solution were taken in a beaker 10 of 500 ml, as illustrated in FIG. 3, added by 0.3 g of a surfactant (HLB 16) to be dissolved therein, to form a hardening solution layer 11. Thereafter, 50 ml of salad oil were poured above the hardening solution layer 11 to give an oil layer 12.

Process 3

The raw liquid 14 was collected in a quantity of exact 0.2 ml by means of an Epfendorf pipette 13, and was dropped from above the oil layer 12. The dropped raw liquid 14 was formed into a spherical granule 14' within the oil layer 12, and then fallen into the hardening solution layer 11 with an oil coat retaining therearound. At this time, the oil coat was slowly separated from the granule 14', which was brought into contact with calcium chloride solution to initiate hardening.

After allowed to be still for about 10 minutes, the hardened granule 15 was taken out and washed briefly with pure water.

Process 4

As illustrated in FIG. 5, 200 ml of 0.3% sodium alginate solution 16 (referred to as liquid C, hereafter) previously prepared, were fed in a beaker 20 of 300 ml and added by the hardened granule 15 while stirred gently, to immerse and react therein for about 10 minutes.

An alginate coat 17 was formed around the immersed granule 15, to yield a coated granule.

The granule thus coated was taken out of the liquid C 16, washed with pure water and dried for about 5 hours in a draft drier kept at 40° C., to yield the objective flavoring granule.

Properties of thus obtained flavoring granules were as follows.
Number of granules: 20 pieces
Weight 0.098±0.003 g
Diameter: maximum 0.583±0.012 cm minimum 0.561±0.013 cm
Breaking strength: 915 g±45 gf
Ratio of the fixed flavors: 98%

Measurement of breaking strength was conducted in such a way that: the flavoring granules were subjected to a conditioning treatment for 24 hours in a conditioning chamber (23° C., 60 RH %), and thereafter to a compression test apparatus to measure the stress (gf) at the time of compression breakage under the compression rate of 10 mm/min.

Meanwhile, the quantitative determination of the flavors was carried out in the following way. 10 pieces of the flavoring granules were fed in a Erlenmeyer flask provided with a ground stopper, added by 15 ml of dichloromethane and then crushed by means of a glass rod. The resultant mixture was added by naphthalene, serving as an internal standard, and subjected to a shaking extraction for one hour by means of a shaker after covered with a stopper. The extract was filtered with a filter paper, and a certain quantity of the filtrate was subjected to a gas chromatography to analyze.

The ratio of the fixed flavors was determined in the following way in accordance with the above described quantitative method. First, quantitative measurements of the remaining favors were conducted on the flavoring granules which were dried in a draft drier (40° C., for 5 hours), and the same granules which were further retained in the drier at 80° C. for 4 hours. Then, the ratio of the latter measurement value to the former measurement value was calculated.

Smoking test

Using thus obtained flavoring granules, a smoking test was conducted in the following manner. Used was a commercially available cigarette (to be referred to as cigarette A hereinafter) provided with a filter trip which has a center portion filled with active carbon power. The filter trip of the cigarette A was cut at the center thereof in a longitudinal direction, and after removing the active carbon powder contained therein, single piece of the flavoring granule prepared in the present example was inserted therein as a substitution. The cut part was patched up by means of an adhesive tape to prepare a cigarette for a smoking test. Thus prepared cigarette was lit as it was and smoked by three puffs. The result was only an original taste inherent to the cigarette A.

Then, the flavoring granule was broken by gently pressing, with a tumb and a finger, the filter tip of the test cigarette. At this time, the flavoring granule was broken with a destruction sound so that its breakage was readily confirmed. When the cigarette in this state was smoked by one puff, a strong menthol flavor was felt.

COMPARATIVE EXAMPLE 1

The flavoring granules were prepared in the same manner as in Example 1, except that the amount of the distilled water in the Process 1 was changed into 40 cc and that casein was not added in the Process 2.

Properties of the obtained flavoring granules were as follows.
Weight: 0.128±0.008 g
Diameter: maximum 0.588±0.014 cm minimum 0.572±0.011 cm
Breaking strength: 2020 g±158 gf
Ratio of the fixed flavors: 98%

As is apparent from the above results, the obtained flavoring granules were heavy and dense as compared with those obtained in the Example 1. Also the breaking strength was nearly twice as high as that of the Example 1, so that the granules were difficult to be crushed other than by applying considerably large pressure. As a result, the granule breakage by pressing with a thumb and a finger became difficult. Furthermore, upon destruction, the granules were crushed not into fine pieces but into rather large blocks so that the flavoring of menthol was delayed.

COMPARATIVE EXAMPLE 2

The flavoring granules were prepared in the same manner as in Example 1 except that 10 g of rice powder, which were previously ground and classified (30 to 60 mesh), were added replace of casein.

Properties of thus produced flavoring granules were as follows.
Weight 0.112±0.006 g
Diameter: maximum 0.561±0.023 cm minimum 0.528±0.018 cm Flavoring granules thus produced had rugged surfaces due to the rice powder, resulting in a deteriorated touch of a rough feel. The spherical shapes of the granules were somewhat deformed, and the dispersion in size became a little larger.

As compared with Example 1, the obtained flavoring granules had a little smaller diameters but become heavier and denser. As a result, the breaking strength became too high to be crushed easily. Furthermore, upon breakage, the granules were seldom crushed into fine pieces. Consequently, the flavoring of menthol was further delayed.

EXAMPLE 2

The flavoring granules were prepared in the same manner as in Example 1, except that the amount of the distilled water in the Process 1 was changed into 55 ml and that the amounts of corn starch and casein in the Process 2 were respectively changed into 15 g.

Properties of thus obtained flavoring granules were as follows.

Weight 0.094±0.004 g
Diameter: maximum 0.581±0.011 cm minimum 0.558±0.015 cm
Breaking strength: 840 g±30 gf
Ratio of the fixed flavors: 97%

Smoking test

Test cigarette containing a flavoring capsule of Example 2 in its filter tip, was prepared in the same manner as in Example 1 and subjected to a smoking test The breakage of the flavoring capsule could be done more easily than in Example 1, and the touch of the breakage could also be improved into a dry, comfortable touch. Menthol taste was felt as much as in Example 1.

EXAMPLE 3

The flavoring granules were prepared in the same manner as in Example 1, except that the amount of the distilled water in the Process 1 was changed into 45 g and that the amounts of corn starch and casein in the Process 2 were respectively changed into 25 g and 5 g. Properties of thus produced flavoring granules were as follows.

Weight 0.104±0.004 g
Diameter: maximum 0.566±0.010 cm minimum 0.540±0.013 cm
Breaking strength: 1230 g±64 gf
Ratio of the fixed flavors: 97%

Smoking test

Test cigarette containing a flavoring capsule of Example 3 in its filter tip, was prepared in the same manner as in Example 1 and subjected to a smoking test.

The breakage of the flavoring capsule required a higher pressure than in Example 1, and the breakage touch was felt rather inferior. The menthol taste was also felt thinner.

EXAMPLE 4

A glass beaker 10 having a diameter of 80 mm and a capacity of 300 ml was taken as shown in FIG. 3, and exact 200 ml of the hardening solution 11 (calcium chloride solution of 0.7 wt. %) were fed therein. 70 ml of salad oil 12 (viscosity: 300 cp at 25° C.) were gently poured above the hardening solution layer, and the resultant mass was allowed to be left for about 10 minutes to separate into two layers.

Separately, the raw liquid for granules were prepared in the following manner. 100 parts by weight of the distilled water were added by 1.5 parts of sodium alginate (1%; viscosity: 60 cp at 25° C.) and stirred to dissolve. After the complete dissolution of sodium alginate, 20 parts of corn starch ($\beta$ type) which were previously mixed in a powder form, 10 parts of milk casein, and 6 parts of mint oil were added thereto and mixed with stirring to give a paste.

Thus prepared raw liquid for granules was accurately taken by 0.25 ml by means of an Epfendorf pipette 13, and was allowed to fall as a drop 14 into the salad oil layer 12 from a height of about 20 mm from the oil layer surface.

The liquidous drop 14 was gradually formed into spherical while falling down slowly in the salad oil layer 12. When said drop 14 reached to the interface between the salad oil layer 12 and the hardening solution layer 11, it stayed there for about 20 seconds due to the interface tension. While staying, the drop 14' became almost complete spherical and thereafter it fell down into the hardening solution layer 11.

Thus fallen drop 14' was first covered with an oil coat, which was separated therefrom during the falling or while staying still at the bottom of the braker 10. The separated oil returned into the upper oil layer 11 and assimilated therein. The drop 14' free from oil began to react with calcium chloride, and started hardening while retaining its spherical shape. After about 10 minutes from the falling into the hardening solution, the drop terminated the hardening reaction to yield a spherical gel 15 having a diameter of about 8 mm. Thus obtained spherical gel 15 was washed with distilled water, and subjected to drying for 5 hours at about 30° C. by means of a draft drier. The resultant granule was measured and the results are as follows.

Number of granules measured: 30 pieces
Maximum diameter: 6.12 mm (standard deviation: <Xmax> 0.11)
Minimum diameter: 5.88 mm (standard deviation: <Xmin> 0.11)
Shape: nearly spherical As a comparison, the granules were prepared in tne same manner as in the above Example 4 except that the salad oil layer 2 was not used, and in accordance with the conventional method shown in FIG. 1.

200 ml of 0.7 wt. % of calcium chloride solution was fed in a beaker of 300 ml, to which 0.25 ml of the raw liquid for granules prepared in the same way as in the above Example, were taken and dropped just in the same way as in the above Example at the height of about 20 mm from the liquid surface. The drop started hardening instantaneously in the hardening solution but the shape thereof could not get spherical, but nonuniform oval and the drop terminated hardening as it was. In order to prepare spherical granule by this method, attempts were done with various preparation conditions, such as different falling distances and different concentrations of calcium chloride, etc., but the satisfactory results were not obtained.

EXAMPLE 5

A glass beaker 10 having a diameter of 80 mm and a capacity of 500 ml was taken, and 300 ml of the hardening solution 11 (0.7 wt. % calcium chloride solution) were fed therein. 100 g of the salad oil (viscosity: 300 cp at 25° C.), which were previously added by 0.3 g of a surfactant "Tween 20" and mixed well with stirring, were poured gently onto the hardening solution layer and the resultant mass was allowed to be left for about 10 minutes.

0.5 ml of the raw liquid for granules prepared in the same way as in Example 4 were collected accurately by means of an Epfendorf pipette, and allowed to fall as a drop 14 at a height of about 10 mm from the salad oil layer surface.

The drop 14 was formed into a spherical shape while passing through the salad oil layer 12 containing the surfactant, and was fallen into the hardening solution layer 11 practically without staying on the interface Thus fallen drop 14 was separated from the oil coat in the hardening solution 11 and began to harden. By subjecting to the hardening reaction for about 10 minutes. a spherical gel 15 having a diameter of about 10 mm was obtained. Thus produced gel 15 was washed with distilled water and dried for about 5 hours by means of a draft drier at 30° C. The resultant granule was measured and the results are as follows.

Number of granules measured: 30 pieces
Maximum diameter: 7.63 mm (standard deviation: $<Xmax>0.14$)
Minimum diameter: 7.41 mm (standard deviation: $<Xmin>0.12$)
Shape: nearly spherical

EXAMPLE 6

First, a glass breaker 10 having a diameter of 80 mm and a capacity of 500 ml was taken, and 300 ml of the hardening solution 11 (0.7 wt. % calcium chloride) were fed therein followed by an addition of surfactant "DK Ester SS" in amounts of approximately 0.3 g to dissolve therein.

100 g of the salad oil 12 (viscosity: 300 cp at 25° C.) were poured gently onto the hardening solution 11. and the resultant mass was left still for about 10 minutes. 0.5 ml of the raw liquid for granules, whicn were prepared in the same manner as in Example 4, were collected accurately by means of an Epfendorf pipette and allowed to fall as a drop 14 at the height of about 10 mm from the salad oil layer surface 12.

The drop 14 was formed into a spherical shape while passing through the salad oil layer 12, and fallen into the hardening solution layer 11 practically without staying on the interface. As soon as thus fallen drop 14 was separated from the oil coat, it started hardening in the hardening solution layer 11. By subjecting to the hardening reaction for about 10 minutes, a spherical gel 15 having a diameter of about 10 mm was obtained. Thus obtained gel 15 was washed with distilled water and dried for about 5 hours by means of a draft drier at 30° C. The resultant granule was measured and the results are as follows.

Number of granules measured: 30 pieces
Maximum diameter: 7.66 mm (standard deviation: $<Xmax>0.16$)
Minimum diameter: 7.43 mm (standard deviation: $<Xmin>0.13$)
Shape: nearly spherical

EXAMPLE 7

Experiment was conducted in the same manner as in Example 4 except for the following procedure. 0.9 ml of the raw liquid for granules prepared in the same way as in Example 4, were taken accurately by means of an Epfendorf pipette and allowed to feed in the salad oil layer 12 with the tip of the pipette immersed into the oil layer as shown in FIG. 4. The drop 14 thus introduced directly into the salad oil layer 12, was formed into a nearly complete spherical shape during the slow falling-down in the oil layer and stayed still on the interface for about 5 seconds, during which it was formed into a complete spherical shape. Thereafter the drop 14 fell down into the hardening solution layer 11. As soon as the drop 14 was separated from the oil coat, it started hardening to yield a spherical gel 15 having a diameter of about 12 mm after about 20 minutes. Thus produced gel 15 was dried in the same way as in Example 4 and the resultant granule was measured, of which results are as follows.

Figure 2:
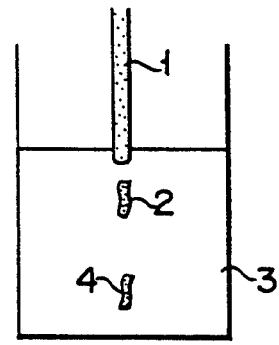

Number of granules measured: 30 pieces
Maximum diameter: 9.53 mm (standard deviation: $<Xmax>0.22$)
Minimum diameter: 9.34 mm (standard deviation: $<Xmin>0.18$)
Shape: nearly spherical For comparison, the test was conducted in the same manner as in the above Example 7 with the tip of the pipette 13 immersed into the hardening solution 11 but without employing the salad oil layer 12, i.e. in accordance with the conventional method as illustrated in FIG. 2. As a result, spherical granules could not be obtained because the drop 14 directly introduced in the solution was gelated as it was, i.e. in a rod shape.

EXAMPLE 8

The flavoring granules were prepared as in Example 4, except that a surfactant was added to the hardening solution layer 11 and/or oil layer 12 in Example 8. The experiment was intended to look into the effects produced by the surfactant addition with respect to the hardening time, the state of oil-removal in the hardening solution layer, and the shape of the manufactured grains. The surfactant used was "DK Ester SS (HLB of about 19)" manufactured by Dai-ichi Kogyo Seiyaku K.K The surfactant concentration was 0.006%. The result of the experiment was as summarized below:

1. Surfactant addition to oil layer 12 alone
   (a) It took about 40 to 42 seconds for the grains to be completely hardened.
   (b) The grain shape was somewhat deviant from a complete spherical shape.
   (c) Oil removal from the grains within the hardening solution layer 11 was poor. Oil was not removed from some of the grains even after the hardening solution layer 11 was left to stand for scores of minutes.

2. Surfactant addition to hardenir.g solution laver 12 alone
   (a) It took about 40 to 42 seconds for the grains to be completely hardened.
   (b) The grains were substantially spherical.
   (c) Oil removal from the grains within the hardening solution layer 11 was satisfactory. Oil began to be separated in 2 to 6 seconds.

3. Surfactant addition to both hardening solution layer 11 and oil layer 12
   (a) It took about 40 to 42 seconds for the grains to be completely hardened.
   (b) The grain shape was very slightly deviant from a complete spherical shape.
   (c) Oil removal from the grains within the hardening solution layer 11 was satisfactory. Oil began to be separated in 2 to 6 seconds.

As apparent from the above, no difference was recognized in the hardening time among these three cases. However, the prepared grains were closest to complete spheres in case 2 where the surfactant was added to the hardening solution layer alone, and were poorest in the shape of the prepared grains in case 1 where the surfactant was added to the oil layer alone. The grain shape in case 3 where the surfactant was added to both the hardening solution layer and the oil layer was intermediate between cases 1 and 2. When it comes to the oil removal, case 1 was poor, and cases 2 and 3 were satisfactory. It should also be noted that a surfactant is costly.

It follows that it is desirable to add a surfactant to the hardening solution layer alone.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A flavoring granule for tobaccc products comprising:
   a solid substrate granule which comprises natural polysaccharides or derivatives thereof; and
   a flavor for tobacco products which is contained in said solid substrate granule and is encapsulated therein so as to be released upon breakage of said solid granule, wherein said solid substrate granule further contains casein as a diluent for the flavor.

2. A flavoring granule for tobacco products according to claim 1, wherein said natural polysaccharides or derivatives thereof are selected from the group consisting of pectins, gum arabic, gelatin, carageenan, sodium alginate, starch and derivatives thereof, cellulose derivatives, and a mixture of these compounds.

3. A flavoring granule for tobacco products according to claim 2, wherein said polysaccharides or derivatives thereof comprise a mixture of a salt of alginic acid and a salt of carboxymethylcellulose.

4. A flavoring granule for tobacco products according to claim 1, wherein said flavor is a solid at bient temperature.

5. A flavoring granule for tobacco products according to claim 1, wherein said flavor is a fluid at ambient temperature and is absorbed in a porous powder so as to be encapsulated in said granule.

6. A flavoring granule for tobacco products according to claim 1, wherein the surface of said solid substrate granule is further covered by a coat comprising natural polysaccharides or derivatives thereof.

7. A method for preparing a flavoring granule for tobacco products comprising a step of hardening a drop of a hardenable liquidous raw material containing natural polysaocharides or derivatives thereof, and flavors with casein serving as a diluent, by feeding the drop into a certain hardening soution layer capable of hardening said liquidous raw material, wherein
   a liquidous oil layer which has a smaller specific gravity and a smaller surfacial tension than said hardening solution and does not mingle with said hardening solution, is so arranged to be brought into contact with the surface of said hardening solution to form an interface therebetween;
   said drop of said liquidous raw material is fed into said liquidous oil layer and is allowed to stay therein for certain period of time to be formed in a spherical shape and thereafter allowed to fall into said hardening solution; and
   said hardening solution layer contains a surfactant.

8. A method for preparing a flavoring granule for tobacco products according to claim 7, wherein said liquidous oil layer contains a surfactant.

9. A method for preparing a flavoring granule for tobacco products according to claim 7, wherein said liquidous oil layer comprises an edible oil.

10. A method for preparing a flavoring granule for tobacco products according to claim 7, wherein said hardening solution layer is an aqueous solution of a metal salt.

* * * * *